United States Patent [19]

Hanson et al.

[11] Patent Number: 5,235,529
[45] Date of Patent: Aug. 10, 1993

[54] REAL TIME SUSPENSION CONTROL WITH DIGITAL ALL-PASS, HIGH-PASS FILTER

[75] Inventors: Reed D. Hanson, Dayton; Kamal N. Majeed, Centerville; Steven L. Tracht, Springboro; John J. Westerkamp, Beavercreek, all of Ohio

[73] Assignee: General Motors Corporation, Detroit, Mich.

[21] Appl. No.: 695,881

[22] Filed: May 6, 1991

[51] Int. Cl.$^5$ ................... G06F 15/20; B60G 23/00
[52] U.S. Cl. ................................. 364/572; 280/707; 364/424.05
[58] Field of Search .............. 280/707, 840; 364/424.01, 424.05, 424.1, 572, 724.01, 724.17

[56] References Cited

U.S. PATENT DOCUMENTS

| | | | |
|---|---|---|---|
| 3,807,678 | 4/1974 | Karnopp et al. | 248/358 R |
| 4,242,732 | 12/1980 | Campbell | 364/572 X |
| 4,696,489 | 9/1987 | Fujishiro et al. | 280/707 |
| 4,838,574 | 6/1989 | Baraszu | 364/424.01 X |
| 5,062,657 | 11/1991 | Majeed | 364/424.05 X |
| 5,073,860 | 12/1991 | Blackburn et al. | 364/424.05 |
| 5,101,355 | 3/1992 | Wada et al. | 364/424.05 |

OTHER PUBLICATIONS

"Dual Processor Automotive Controller"; Kamal N. Majeed; IEEE/Applications of Automotive Electronics; Oct. 19, 1988.
Regalia et al., "The Digital All-Pass Filter: A Versatile Signal Processing Building Block", *Proceedings of the IEEE*, vol. 76, No. 1, Jan. 1988.

Primary Examiner—Kevin J. Teska
Attorney, Agent, or Firm—Robert M. Sigler

[57] ABSTRACT

In a vehicle suspension control in which the output of a vehicle body mounted absolute vertical acceleration sensor is integrated to provide an absolute vertical velocity signal, the sensor output is high pass filtered to remove DC components but pass components in the frequency range 1-2 Hz. The filter comprises a second order digital all-pass filter embodied recursively on a 16 bit, fixed point, digital signal processor (DSP). A first stage normalized lattice two-pair network reduces to a unity gain stage; and a second stage single multiplier two-pair lattice network minimizes computational time. The 32 bit internal accumulators of the 16 bit DSP are used advantageously to prevent errors due to internal overflow of the recursive variable.

5 Claims, 4 Drawing Sheets

REAL TIME SUSPENSION CONTROL WITH DIGITAL ALL-PASS, HIGH-PASS FILTER

BACKGROUND OF THE INVENTION

This invention relates to real time suspension controls for motor vehicles, and particularly to such controls responsive to a vertical vehicle body absolute velocity parameters derived by integration from a vertical absolute acceleration sensor mounted on the vehicle body.

A key parameter for use in the control of some vehicle suspensions is the absolute vertical velocity at some point of the vehicle body. At present, there exist no practical absolute velocity sensors for directly measuring this parameter. It can be obtained, however, by integrating the output of a vertical absolute acceleration sensor at the same point, provided that the acceleration sensor output signal is high-pass filtered to remove all DC components that might otherwise cause integrator saturation and drift.

The natural frequency of vibration of a typical vehicle body is in the range 1-2 Hz. To prevent loss of information in this frequency range, a high pass filter must have a steep rise from zero Hz (DC), where full suppression is desired, to the beginning of its passband at 1 Hz, where minimum suppression is desired. Using a traditional, one pole filter design and an integrator with a low frequency, one pole rolloff for additional high pass filtering, the filter pole resides very close to the integrator pole; and quantization error becomes significant in a digital machine embodiment of the filter. A sixteen bit, fixed point, digital processing (DSP) machine is desirable for its comparatively low cost; but substantial integrator drift may occur with a standard one pole high pass filter on such a machine due to quantization errors. Alternative fixed point DSP machines with greater resolution or floating point computing machines increase the cost.

SUMMARY OF THE INVENTION

A sixteen bit, fixed point, digital signal processor may be used for a high pass filter as described above with acceptable quantization error and speed of processing if it is programmed with a digital second order all-pass filter configured as a high pass filter. The input to the filter routine is summed with its output with the sum divided by two. The filter routine itself comprises a normalized lattice two-pair network for the first stage, which reduces to a negative unity gain, and a single multiplier two-pair lattice network for the second stage. The resulting routine requires only one 16×32 bit multiplication.

Further details and advantages of the invention will be apparent from the accompanying drawings and following description of a preferred embodiment.

DESCRIPTION OF THE PREFERRED EMBODIMENT

Figure 1:
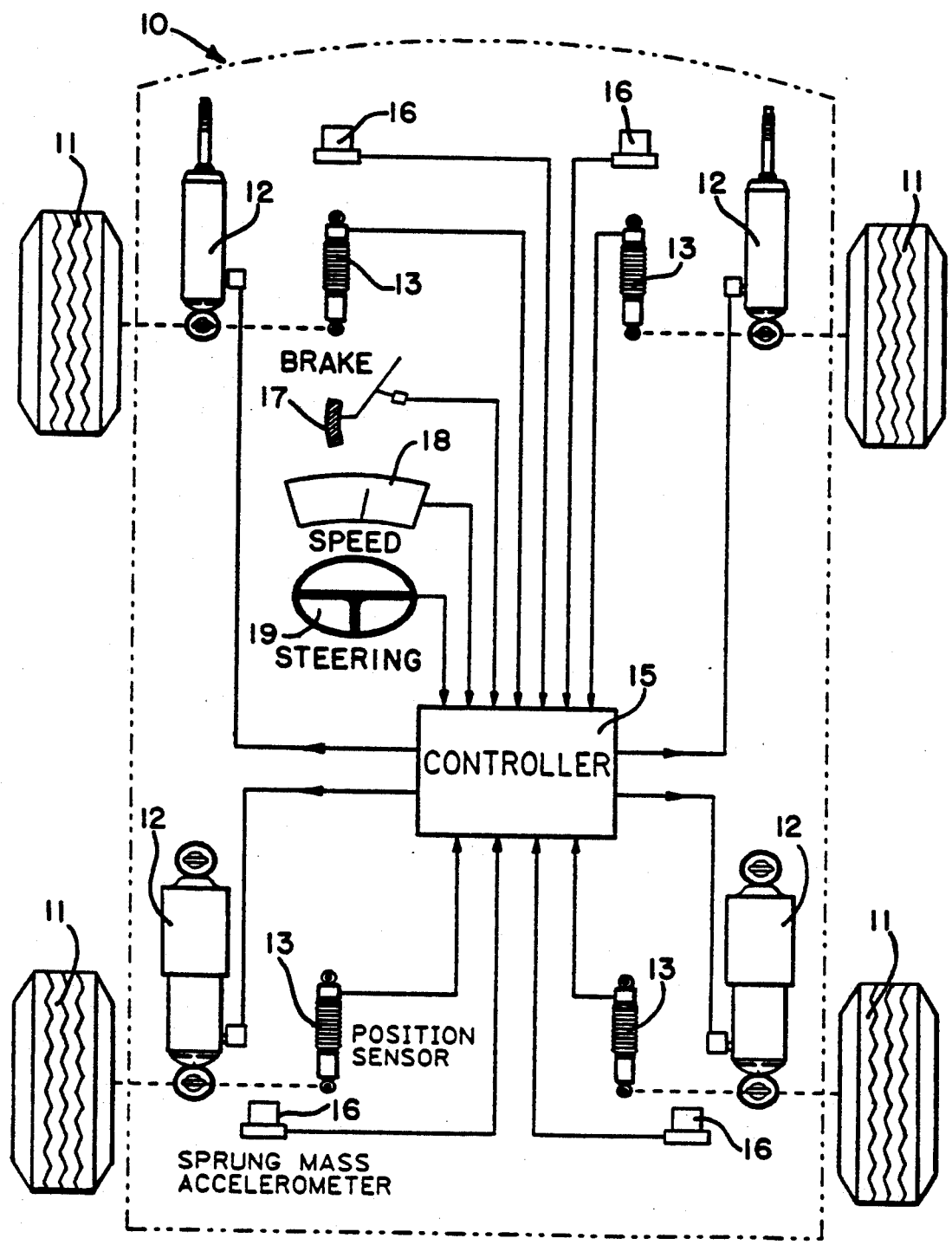
FIG. 1 is a schematic diagram of a motor vehicle with a suspension control according to this invention.

FIG. 1 shows a schematic diagram of a motor vehicle with a suspension control according to the invention. The vehicle has a body 10 comprising a sprung mass. Body 10 is essentially rectangular in shape and is supported on a wheel 11 at suspension points comprising each of its corners by suspension apparatus 12 comprising a weight bearing suspension spring in parallel with a suspension actuator connected to exert a controllable force in parallel with the spring between the body 10 and wheel 11 at that suspension point. The suspension actuator may be a hydraulic or electric actuator capable of providing power to the suspension, as used in a fully active suspension control. Alternatively, the actuator may be a variable damper, which is capable only of dissipating power, as used in a semi-active suspension control. If a variable damper, it may provide damping control in either a continuous or a discrete manner. Suspension apparatus 12 further includes an axle for rotatably supporting wheel 11 and such other suspension components, such as control arms, as are required for and comprise the unsprung mass of a standard vehicle suspension.

At each corner of body 10, a suspension position sensor 13 may be connected between the body and unsprung mass to measure the relative vertical position thereof and generate an output vertical suspension position signal for input to a controller 15. The relative vertical suspension position signal may be differentiated to produce a relative body/wheel vertical velocity signal. An acceleration sensor 16 is also positioned at each corner of body 10; and sensor 16 generates an absolute vertical acceleration signal of that corner of body 10 for input to controller 15. The absolute body corner velocities at the four corners of the body may be derived from these acceleration signals by first deriving vehicle body heave, roll and pitch accelerations, integrating these accelerations to provide vehicle body heave, roll and pitch velocities and transforming these to vehicle body corner velocities. From the difference between the body corner velocity and relative body/wheel velocity at each corner, controller 15 is able to compute the vertical wheel velocity at that corner; and from the wheel velocity and various body corner velocities, controller 15 is able to compute the desired force between the body and wheel at that corner of the vehicle. Acceleration sensors 16 should be mounted with care so as to minimize cross-axis sensitivity which might contaminate the vertical acceleration signal with horizontal acceleration information. Additional signals which may optionally be generated are a vehicle deceleration or braking signal by brake sensor 17, a vehicle speed signal from vehicle speed sensor 18 and a vehicle steering signal from vehicle steering sensor 19. These latter signals are not required for the suspension control of this invention and will not be further described. However, many examples of such sensors and their uses for suspension control are known in the prior art.

Figure 2:
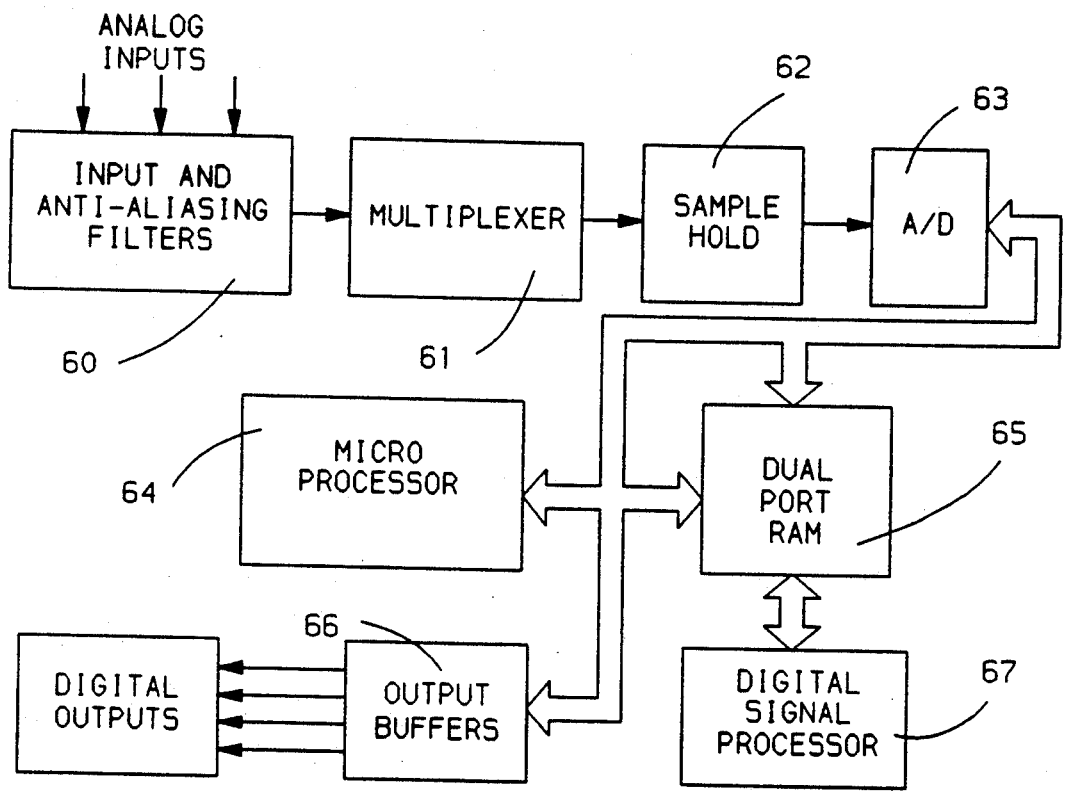
FIG. 2 is a block diagram of a controller for use in the suspension control of FIG. 1.

The hardware configuration of controller 15 is shown in schematic and block diagram form in FIG. 2. The analog inputs from sensors 13, 16, and 17-19 are processed in input apparatus 60, which includes sensor interface circuitry, anti-aliasing filters and any additional analog signal processing such as the differentiating of the relative position signals from sensors 13 to form relative velocity signals. The integration of the body corner acceleration signals from sensors 16 is performed in software within the digital circuitry to be described.

With regard to the input signals, it should be noted that the control has been found to work well, at least in the case of an on/off damping actuator, with a loop frequency of 1 KHz, which means that, to avoid aliasing distortion, the input signals should be low pass filtered to avoid any significant input signals at frequencies above 500 Hz. the differentiator, especially, needs to be designed with care, since differentiation, by nature, accentuates the high frequencies in the signal and heavy filtering tends to introduce phase delays which can slow system response.

The processed and filtered input signals are read into the system by a multiplexer 61, which provides each signal, in turn, to a sample/hold apparatus 62 and an analog/digital (A/D) converter 63. The signals can be pipelined through this portion of the apparatus to speed data read-in. The output of the A/D apparatus is provided to an eight bit data bus connected also to a microprocessor 64, RAM 65 and output buffers 66. A separate 16 bit data bus connects dual port RAM 65 to a digital signal processor (DSP) 67. Microprocessor 64, which may, for example, be one of the 68HC11 family made by the Motorola (R) Corporation, contains the basic system operating software and controls the data handling and decision making tasks of the control; while DSP 67, which may be a TMS320C15 or TMS320C17 made by Texas Instruments (R) Corporation, is optimized for mathematical computations such as multiplication, which would greatly slow down a general purpose microprocessor. Such multiplications are used both in the solution of the control equations and in the digital integration routine to be described. The output buffers 66 interface the digital processing apparatus with the four actuators 12 and may further include digital low pass filtering to prevent output of signals at frequencies higher than those to which the actuators need respond. A more complete description of the hardware can be found in the paper "Dual Processor Automotive Controller" by Kamal N. Majeed, published in the proceedings of the IEEE/Applications of Automotive Electronics, Dearborn, Mich., Oct. 19, 1988. However, cost savings may be achieved in a mass produced system by the replacement of the dual port RAM 65 with ordinary RAM and the use of a software controlled interface bus between the microprocessor and DSP and a three line serial interface for input and output, as known to those skilled in the art of microcomputer system design.

As previously mentioned, the derived vehicle body heave, roll and pitch acceleration are each high pass filtered and integrated to generate corresponding velocities. The problems involved in this process in a vehicle having a natural resonant body frequency of 1–2 Hz and a 16 bit, fixed point digital signal processor are discussed in the Background section at the beginning of this specification. A solution to these problems is found in the use of a digital all-pass filter.

A digital all-pass filter passes all frequencies but causes the phase to shift through a selected frequency range determined by the filter parameters. The transfer function for a second order all-pass filter is given by the following equation:

$$A(z) = \frac{k_2 + k_1(1 + k_2)z^{-1} + z^{-2}}{1 + k_1(1 + k_2)z^{-1} + k_2 z^{-2}},$$

wherein $k_1$ determined the center of the phase shift and $k_2$ determines the bandwidth of the phase transition. The constant $k_1$ is calculated as $$k_1 = -\cos(\omega_0),$$

wherein $\omega_0$ is the normalized digital center frequency of the phase shift, which is defined as the center frequency divided by the folding frequency. The constant $k_2$ is derived from $$k_2 = [1 - \tan(\Omega/2)]/[1 + \tan(\Omega/2)],$$

wherein $\Omega$ is the normalized digital bandwidth, defined as the bandwidth divided by the folding frequency, which latter is one half the sampling rate.

Figure 3A:
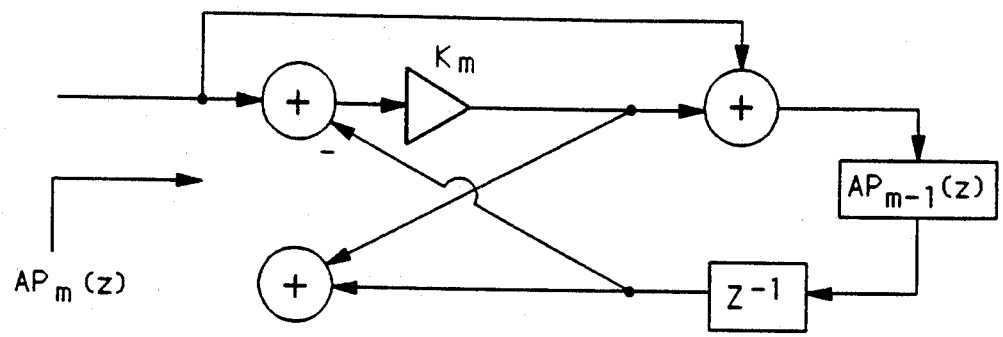
FIGS. 3(A)-3(D) are block diagrams useful in explaining the operation of the controller in FIG. 2.
Figure 3B:
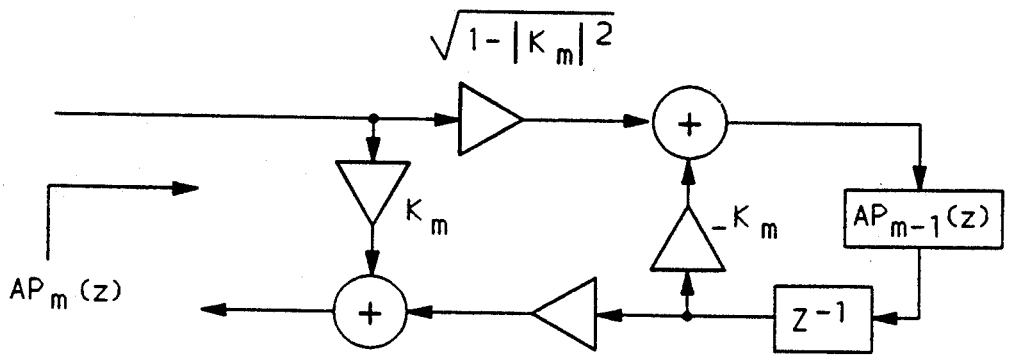

The digital all-pass filter may be implemented in several forms. The most computationally efficient structure is the single multiplier lattice two-pair network, as seen in FIG. 3(A), since it requires only a single multiplier $k_m$. A second alternative is the normalized lattice two-pair network, as seen in FIG. 3(B). In the case of a high pass filter, the center frequency is zero (DC). To produce the velocity signal in the required frequency bands, a filter bandwidth of 0.1 Hz is mandated. The normalized center frequency $\Omega_0 = 0.0$ and, since the desired phase shift is $2\pi$ radians, $k_1 = -1.0$. Normalizing the bandwidth provides $$\Omega = \frac{\text{Bandwidth}*2\pi}{\text{Sampling Frequency}} = \frac{0.2\pi}{500} = 0.00062832,$$

wherein the Bandwidth and Sampling Frequency are both in Hz; and $k_2$ therefore equal 0.9994.

Figure 3C:
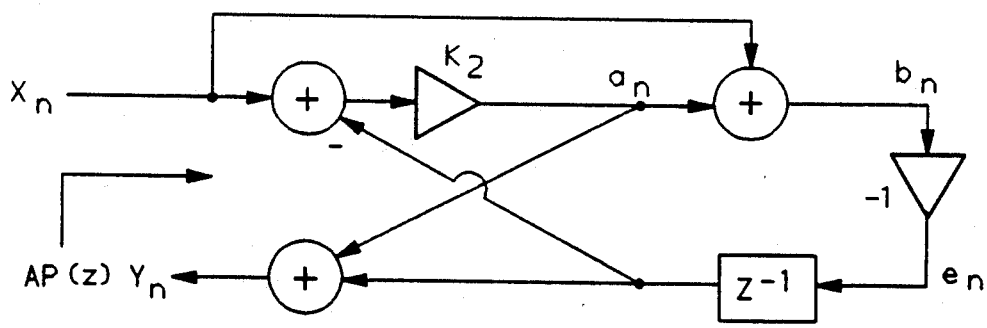

To minimize computations, the single multiplier two-pair lattice network is used for the second stage of the filter. The normalized lattice two-pair network is used for the first stage, due to the reduction in structure when $k_m = \pm 1$. Substituting $k_1 = -1.0$ for $k_m$ in the normalized two-pair lattice network, the $\sqrt{(1 - |k_1|^2)}$ term reduces to 0.0. IN addition, since this is the first stage, the $AP_{m-1}(z)$ block is unity. Thus, the first stage reduces to a negative unity gain stage. The final, reduced all-pass filter lattice network, is shown in FIG. 3(C).

Figure 3D:
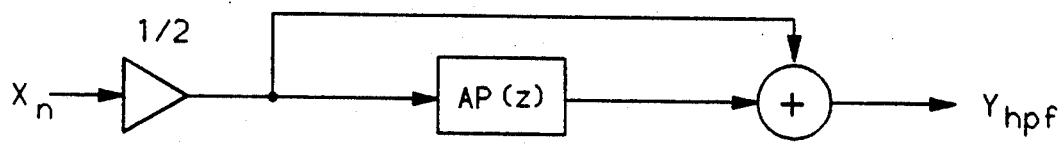

To implement the high pass filter utilizing the all-pass filter design, a band-reject structure is used, as shown in FIG. 3(D). The input is passed through the all-pass filter network, and the output of the all-pass is summed with the input, with an initial scale factor of 0.5 to compensate for the doubling effect of the summing junction.

From the diagrams in FIGS 3(C) and 3(D), the difference equations are derived as follows:

$$a_n = k_2(x_n - e_{n-1});$$

$$b_n = a_n + x_n;$$

$$e_n = -b_n;$$

$$y_n = a_n + e_{n-1} \text{ (all-pass output)};$$

$$y_{hpf} = 0.5(x_n + y_n) \text{ (high pass output)}.$$

Since the intermediate variable e is the only recursive variable, these difference equations can be reduced, while maintaining the benefits of the lattice structure:

$$e_n = -[k_2(x_n - e_{n-1}) + x_n];$$

$$y_{hpf} = 0.5(e_{n-1} - e_n).$$

Although the total gain for the all-pass, high pass filter is unity, the intermediate variables can overflow. Since e is a recursive variable, intermediate overflows are not acceptable; and compensation for the overflow is required.

The greatest overflow in the intermediate variables will occur at the center frequency of the filter or, in this case, at DC. Simulation of a 0.1 Hz bandwidth filter with a DC input shows that an overflow slightly larger than a factor of 3,000 occurs for 3. The next greatest power of two is 4,096. Thus the input must be shifted right by 12 bits (divided by 4096 prior to any arithmetic with e. Since most 16 bit DSP machines have 32 bit accumulators (to accommodate 16×16 bit multiplications), shifts on arithmetic operations are easily accomplished. Finally, the output must be shifted left by 11 bits (multiplied by 2048) to compensate for the right shift of the input minus one bit for the 0.5 scaling factor.

If e is stored as a 16 bit number, using two's complement representation, quantization errors will occur due to the 12 bit shift. Thus e must be stored as a 32 bit number; and this will require 16×32 bit multiplication with the processor described. This multiplication requires significantly more time (×50) than a 16×16 bit multiplication. Although this multiplication increases cycle time on a 16 bit machine, the total time is still less than a traditional filter with extended (32 bit) precision, due to the minimum multiplication implementation.

Figure 4:
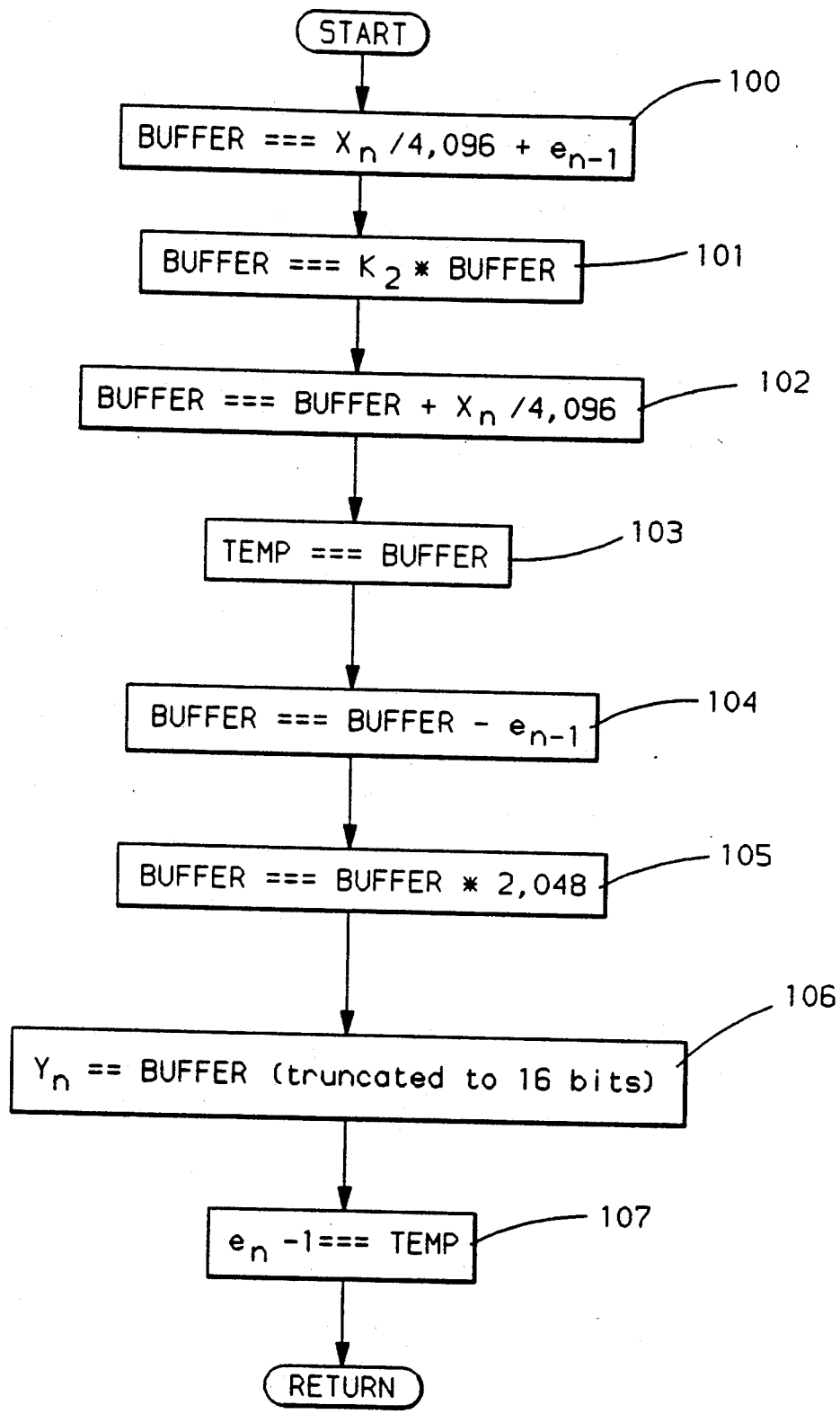
FIG. 4 is a flow chart of the high pass filter operation of the controller of FIG. 2.

The flow chart for the implementation of the filter is shown in FIG. 4. BUFFER, TEMP and $e_{n-1}$ are all 32 bit variables; while $x_n$ and $y_n$ are 16 bit variables. $k_2$ is a 16 bit constant. A triple equal sign (===) represents a 16 bit operation; and a double equal sign (==) represents a 16 bit operation. In most machines, BUFFER is the accumulator and TEMP is a temporary RAM register.

Referring to FIG. 4, $x_n$ is divided in step 100 by 4096 (shifted 12 bits right) and added to $e_{n-1}$. This corresponds to the first summing junction of FIG. 3(C), in which $x_n$ is the input and $e_{n-1}$ is the intermediate value from the $z^{-1}$ block. The result is placed in BUFFER. In step 101, the quantity in BUFFER is multiplied by $k_2$. In step 102, the quantity in BUFFER is added to the input $x_n$ divided by 4096 (shifted 12 bits right); and the result is stored in BUFFER. This corresponds to the second summing junction in FIG. 3(B). In step 103, the quantity in BUFFER is stored in TEMP for use in the next cycle as the recursive variable $e_{n-1}$. In step 104, the present $e_{n-1}$ (from last cycle) is subtracted from the quantity stored in BUFFER with the difference stored in BUFFER. This corresponds to the third and last summing junction in FIG. 3(C). In step 105, BUFFER is multiplied by 2,048 (shifted 11 bits left). This is the net result of multiplying by 4,096 (shift 12 bits left) to compensate for the original 12 bit shift right at the input and a divide by 2 (shift 1 bit right) for the 0.5 factor in FIG. 3(D). In step 106, the 16 most significant bits of BUFFER become $y_n$, which is output as the filtered signal to a standard integrator routine to perform the integration and thus generate the absolute vertical body velocity signal. In step 107, the quantity in TEMP is retained as $e_{n-1}$ for the next cycle.

The embodiments of the invention in which an exclusive property or privilege is claimed are defined as follows:

1. A motor vehicle comprising, in combination:
   a body;
   a wheel;
   a suspension actuator connected between the body and wheel;
   an accelerometer on the vehicle body for providing a vehicle vertical body acceleration signal;
   a high-pass filter comprising a 16 bit, fixed point, digital signal processor with a 32 bit accumulator and a loop time of no more than 1 millisecond, the signal processor being configured as a second order all-pass digital filter having a phase shift center at zero Hz and a phase shift bandwidth of 0.1 Hz, in combination with means for summing the output of the second order all pass digital filter with the vertical body acceleration signal and reducing the sum thereof by a factor of one half, the high pass filter being effective to suppress components of the vehicle vertical body acceleration signal at zero Hz but pass a filtered vehicle body acceleration signal comprising components of the vehicle vertical body acceleration signal above 1 Hz;
   an integrator for integrating the filtered vehicle vertical body acceleration signal to produce a vehicle vertical body velocity signal; and
   apparatus responsive to the vehicle vertical body velocity signal to control the suspension actuator in real time.

2. The motor vehicle of claim 1 in which the second order all-pass digital filter has a first stage comprising a normalized lattice two-pair network and a second stage comprising a single multiplier two-pair network.

3. The motor vehicle of claim 2 in which the first stage normalized lattice two-pair network comprises a unity gain stage.

4. The motor vehicle of claim 1 in which the digital signal processor further comprises, in combination:
   means for dividing the vertical vehicle acceleration signal by 4096, adding the quotient thereof to a stored recursive variable from a previous cycle ($e_{n-1}$), and storing the sum in a first buffer;
   means for multiplying the contents of the first buffer by a constant $k_2$ and storing the product in the first buffer;
   means for adding to the contents of the first buffer the vertical vehicle acceleration signal divided by 4096 and storing the sum in the first buffer and a second buffer;
   means for subtracting the stored recursive variable from a previous cycle from the first buffer and storing the difference in the first buffer;
   means for multiplying the contents of the first buffer by 2048 and outputting the product thereof, truncated to 16 bits, to the integrator; and
   means for storing the contents of the second buffer as the stored recursive variable for the next cycle.

5. The motor vehicle of claim 4 in which the first buffer is the 32 bit accumulator and the means for dividing by 4096 and multiplying by 2048 produce a shifting of data within the accumulator in one direction and the opposite direction, respectively, so that only one fixed point multiplication is required during each cycle.

* * * * *